United States Patent [19]

Swindells et al.

[11] 4,081,520
[45] Mar. 28, 1978

[54] HIGH EFFICIENCY PRODUCTION OF CHLORINE DIOXIDE BY SOLVAY PROCESS

[75] Inventors: Richard Swindells, Caledon; Maurice C. J. Fredette, Mississauga, both of Canada

[73] Assignee: ERCO Industries Limited, Islington, Canada

[21] Appl. No.: 770,360

[22] Filed: Feb. 22, 1977

[30] Foreign Application Priority Data

Mar. 19, 1976 United Kingdom ............... 11123/76
May 7, 1976 United Kingdom ............... 18783/76

[51] Int. Cl.$^2$ .................... C01B 11/02; C01D 5/02; C01D 5/00
[52] U.S. Cl. .................... 423/478; 423/511; 423/520; 423/551
[58] Field of Search ............... 423/478, 479, 520, 551, 423/511

[56] References Cited

U.S. PATENT DOCUMENTS

| 2,605,168 | 7/1952 | Wagner | 423/479 |
| 2,881,052 | 4/1959 | Julien | 423/479 |
| 3,933,987 | 1/1976 | Schultz et al. | 423/478 |

FOREIGN PATENT DOCUMENTS

| 378,289 | 7/1923 | Germany | 423/479 |
| 46-40,527 | 11/1971 | Japan | 423/479 |

*Primary Examiner*—Edward Stern
*Attorney, Agent, or Firm*—Sim & McBurney

[57] ABSTRACT

The efficiency of the Solvay chlorine dioxide producing process is enhanced by the use of a high total acid normality and a single vessel generator-evaporator-crystallizer.

1 Claim, No Drawings

HIGH EFFICIENCY PRODUCTION OF CHLORINE DIOXIDE BY SOLVAY PROCESS

FIELD OF INVENTION

The present invention relates to the production of chlorine dioxide.

BACKGROUND TO THE INVENTION

It is known from U.S. Pat. No. 2,881,052 to form chlorine dioxide by the reduction of an acid aqueous chlorate solution using methanol. However, the reaction involved is quite slow, requiring a time-consuming operation in a succession of reactors and results in a large volume of liquid effluent containing sulphuric acid, unreacted sodium chlorate and sodium sulphate by-product. The efficiency of conversion of chlorate to chlorine dioxide is quite low, generally not exceeding about 90%. Air typically is passed into the reaction medium to dilute the chlorine dioxide.

The overall reaction involved in this prior art process, known commonly as the "Solvay" process, may be represented by the equation:

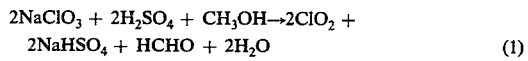

$$2NaClO_3 + 2H_2SO_4 + CH_3OH \rightarrow 2ClO_2 + 2NaHSO_4 + HCHO + 2H_2O \qquad (1)$$

SUMMARY OF INVENTION

It has surprisingly been found that the efficiency of the Solvay process may be substantially improved by using a high total acid normality and carrying out the reaction in a single chambered generator-evaporator-crystallizer vessel, as described in more detail below.

It has been observed that the efficiency of methanol utilization in this invention in the conversion of chlorate to chlorine dioxide often exceeds 100%, indicating that the oxidation products of methanol, namely formaldehyde formic acid also have a role in the efficient production of chlorine dioxide in accordance with this invention. Formaldehyde, formic acid and other organic reducing agents for sodium chlorate may be used in this invention.

GENERAL DESCRIPTION OF INVENTION

In a single chambered generator-evaporator-crystallizer vessel as used in the present invention, chlorine dioxide is generated in continuous manner from a reaction medium which is held in the reaction vessel and is maintained at its boiling point at the prevailing absolute pressure in the reaction vessel and at a temperature below which substantial decomposition of chlorine dioxide occurs. The reaction vessel is maintained under a subatmospheric pressure to maintain the reaction medium at the boiling point and the water evaporated from the reaction medium is used as a diluent gas for the chlorine dioxide. After start-up, by-product acid salt of the cation of the chlorate and the anion of the acid feed is formed, its concentration builds up until the reaction medium is saturated thereby, and the salt deposits from the reaction medium in the reaction vessel once saturation is reached for removal therefrom.

The process is generally conducted under steady state conditions in which the quantity of water introduced to the reaction vessel with the reactants is balanced by the quantity of water removed from the reaction vessel, mainly as diluent gas for the chlorine dioxide, so that the liquid level in the reaction vessel is maintained substantially constant.

In this invention, sodium chlorate, sulphuric acid and methanol are fed to the reaction medium.

The reaction medium has a high acidity. The term "acidity" is usually considered to refer to the total acidity present as determined by titration with a solution of a known concentration of sodium hydroxide to a preselected pH end point. This determination is expressed in terms of normality, i.e., the equivalent number of gram atoms of hydrogen per liter of solution corresponding to the value titrated, and may be referred to as the "total acid normality". The term "total acid normality" is used herein to define acidity in the sense first described.

The reaction medium used in the present invention has a high total acid normality above about 9 normal. In the absence of purposely added chloride ions, it has been found that, with increasing total sulphuric acid normality, the efficiency of conversion of sodium chlorate to chlorine dioxide increases.

Further, it was found that under steady state conditions, varying quantities of sodium chloride were detected in the reaction medium and the quantity of sodium chloride present decreased substantially with increasing total acid normality.

The efficiency of the conversion of sodium chlorate to chlorine dioxide in accordance with reaction (1) above may rise to a very high level, typically up to 99 to 100%, and hence considerably in excess of that achieved in the conventional Solvay process.

The purity of the chlorine dioxide formed, in terms of contamination by chlorine, increases with increasing total acid normality, indicating an increasing tendency for reaction according to equation (1) to occur with increasing total acid normality.

In this invention, the by-product sodium sulphate which is deposited from the reaction medium in the reaction vessel is in the form of sodium bisulphate ($NaHSO_4$), or sodium sesquisulphate ($Na_3H(SO_4)_2$).

In order to utilize the acid values of this sodium sulphate, it may be added to the reaction medium of another chlorine dioxide-producing process in which sodium chlorate and sodium chloride and/or hydrogen chloride are reacted in an acid aqueous medium at a total acid normality of less than about 4.8 normal, the sodium acid sulphate being used to provide all or part of the acid requirement of a chlorine dioxide-producing process. Such a tandem chlorine-dioxide generating procedure is described in more detail in U.S. Pat. No. 3,789,108.

Not only is the efficiency of the Solvay process improved by operation in accordance with the present invention, but the necessity to handle liquid overflow containing sulphuric acid, sodium sulphate and some sodium chlorate and the necessity to use external sources of diluent gas when utilizing the conventional Solvay process, are avoided.

EXAMPLES

The following Example illustrates the invention further.

EXAMPLE

A chlorine dioxide generator was run under different reaction conditions and in each case the efficiency of production of chlorine dioxide and the purity of the chlorine dioxide were determined. In each case, sodium chlorate solution, sulphuric acid and methanol were the only feeds to the generator, the reaction medium was held at its boiling point under a subatmospheric pressure and sodium acid bisulphate deposited from the reaction medium.

Three separate operations were carried out and the conditions and results are set forth in the following Table:

TABLE

|  | Run No. 1 | 2 | 3 |
|---|---|---|---|
| Temperature | 64° C | 66° C | 74° C |
| Pressure | 114 mm Hg | 106 mm Hg | 135 mm Hg |
| MeOH | 100% 5.1ml/min | 33% 3.8 ml/min | 33% 3.4ml/min |
| $H_2SO_4$ | 18M 2.9 ml/min | 9M 7.0 ml/min | 9M 3.6 ml/min |
| $NaClO_3$ | 1.8M 19.1ml/min | 1.8M 38.7ml/min | 6.74M 10.5ml/min |
| Generator liquor: |  |  |  |
| $H_2SO_4$ | 4.40N | 8.04N | 9.3N |
| $NaClO_3$ | 1.56M | 0.87M | 1.1M |
| NaCl* | 0.39M | 0.04M | 0.003M |
| Crystal | 60% $Na_2SO_4$ 40% $NaHSO_4$ | $Na_3H(SO_4)_2$ | $Na_3H(SO_4)_2$ |
| Chlorine dioxide production | 0.21g/l/min | 0.36g/l/min | 0.48g/l/min |
| Gas analysis | 84% $ClO_2$ 16% $Cl_2$ | 88% $ClO_2$ 12% $Cl_2$ | 99% $ClO_2$ <1%$Cl_2$ |
| Efficiency based on chlorate | 87.7% | 78% | >99% |
| Efficiency based on MeOH | 14% | 87% | 127% |
| Feed requirements /lb.$ClO_2$ produced | 1.72 | 0.28 | 0.19 lb.$CH_3OH$ |

Note: *No sodium chloride was purposely added initially, although the sodium chlorate feed contains about 0.003 lb of NaCl impurity per lb/ of $NaClO_3$.

It will be seen from the results of the above Table that as the total acid normality of the reaction medium increases, the rate of production of chlorine dioxide increases, the purity of the chlorine dioxide increases, the quantity of sodium chloride present in the reaction medium decreases and the efficiency of production of chlorine dioxide in terms of chlorate consumed increases.

A typical Solvay process for producing chlorine dioxide has an efficiency in terms of conversion of chlorate to chlorine dioxide of about 89% with a methanol requirement of 0.20 lbs. $CH_3OH$ per lb. $ClO_2$ produced. It will be seen from the above results that by operating under the conditions of run No. 3, i.e., at an acid normality above about 9 normal, a substantial increase in efficiency can be effected.

SUMMARY

The present invention, therefore, provides considerable improvements over the prior art Solvay process for producing chlorine dioxide. Modifications are possible within the scope of the invention.

What we claim is:

1. In a process of producing chlorine dioxide by reducing sodium chlorate with methanol in an aqueous reaction medium containing sulphuric acid in the substantial absence of added chloride ions, the improvement comprises:

maintaining a single-chambered generator-evaporator-crystallizer apparatus containing said aqueous reaction medium under a subatmospheric pressure, maintaining said reaction medium at its boiling point at a temperature below that above which substantial decomposition of chlorine dioxide occurs to evaporate water from the reaction medium and provide a gaseous mixture containing steam and chlorine dioxide, removing said gaseous mixture from said single-chambered apparatus, recovering an aqueous solution of chlorine dioxide from said removed mixture, maintaining substantially steady state conditions in said reaction medium by continuously feeding said sodium chlorate, methanol and sulphuric acid into said reaction medium to make up chemicals consumed in said reducing step and to maintain a total acid normality in said reaction medium in excess of about 9 normal, maintaining the liquid level in said single-chambered apparatus substantially constant by balancing water fed to the single-chambered apparatus with water removed therefrom, continuously depositing sodium bisulphate or sesquisulphate from said reaction medium after the reaction medium becomes saturated thereby after the initial start up of the process, and removing said deposited sodium bisulphate or sesquisulphate from said single-chambered apparatus.